United States Patent
Yoshizawa et al.

(10) Patent No.: US 7,823,619 B2
(45) Date of Patent: Nov. 2, 2010

(54) FILM STRIPPING METHOD AND APPARATUS

(75) Inventors: Takenori Yoshizawa, Tsu (JP); Akira Nozaki, Toyama (JP); Hajime Ogoshi, Toyama (JP)

(73) Assignees: Sharp Kabushiki Kaisha, Osaka-shi (JP); Tateyama Machine Co., Ltd., Toyama-shi (JP)

( * ) Notice: Subject to any disclaimer, the term of this patent is extended or adjusted under 35 U.S.C. 154(b) by 966 days.

(21) Appl. No.: 11/571,553

(22) PCT Filed: Jun. 21, 2005

(86) PCT No.: PCT/JP2005/011361

§ 371 (c)(1),
(2), (4) Date: Jan. 2, 2007

(87) PCT Pub. No.: WO2006/003816

PCT Pub. Date: Jan. 12, 2006

(65) Prior Publication Data

US 2008/0011420 A1   Jan. 17, 2008

(30) Foreign Application Priority Data

Jul. 2, 2004   (JP) .......................... 2004-196459

(51) Int. Cl.
*B32B 38/10* (2006.01)
(52) U.S. Cl. ........................... 156/584; 156/344
(58) Field of Classification Search .......... 156/344, 156/584; 438/464, 976
See application file for complete search history.

(56) References Cited

U.S. PATENT DOCUMENTS 4,867,836 A * 9/1989 Hamamura et al. ......... 156/584
5,312,505 A   5/1994 Sumi et al.

(Continued)

FOREIGN PATENT DOCUMENTS

JP   62-092254 U   6/1987

(Continued)

OTHER PUBLICATIONS (English language) International Preliminary Report on Patentability, Chapter I of the Patent Cooperation Treaty and Written Opinion of the International Searching Authority, dated Jan. 25, 2007, for PCT/JP2005/011361, 8 sheets.

(Continued)

*Primary Examiner*—Mark A Osele
(74) *Attorney, Agent, or Firm*—Holtz, Holtz, Goodman & Chick, PC (57) ABSTRACT

An adhesive tape situated near an edge of a glass board with a protection film pasted on both surfaces thereof, and a stripping head that presses an adhesive surface of the adhesive tape toward the glass board, are provided. An actuator is provided that separates the adhesive tape adhering to the edge of protection film from the surface of the glass board and that strips a part of the protection film from the glass board. A film chuck device is provided that holds the stripped edge of the protection film, and the protection film held by the film chuck device is pulled off by driving the glass board by a roller conveyor.

16 Claims, 11 Drawing Sheets

U.S. PATENT DOCUMENTS 5,676,789 A    10/1997   Hamamura
6,149,758 A  * 11/2000   Tsujimoto et al. ........... 156/344

FOREIGN PATENT DOCUMENTS

| JP | 4-223971 A | 8/1992 |
|---|---|---|
| JP | 6-278936 A | 10/1994 |
| JP | 08-099769 A | 4/1996 |
| JP | 9-114384 A | 5/1997 |
| JP | 2001-287868 A | 10/2001 |

OTHER PUBLICATIONS (Japanese language) International Preliminary Report on Patentability, Chapter I of the Patent Cooperation Treaty and Written Opinion of the International Searching Authority, dated Jan. 18, 2007, for PCT/JP2005/011361, 9 sheets.

* cited by examiner

FILM STRIPPING METHOD AND APPARATUS

This application is a U.S. National Phase Application under 35 USC 371 of International Application PCT/JP2005/011361 filed Jun. 21, 2005.

TECHNICAL FIELD

This invention relates to a method and apparatus for stripping a protection film affixed to the surface of a glass board used for a liquid crystal display or the like.

BACKGROUND ART

As a glass board used for a liquid crystal display, one large glass board is sliced into plural glass boards for individual displays. Because of the recent increase in size, when this large glass board arrives at a plant, plural such glass boards are superimposed and carried in this state to a manufacturing process. When using the glass boards, one of the superimposed large glass boards is taken out and used. Therefore, a protection film for preventing flaws is affixed to both sides of each glass board, and this protection film is stripped when the board is processed.

As methods for stripping the protection film, stripping methods using an adhesive tape have been known, for example, as disclosed in Patent References 1 and 2. Patent Reference 1 discloses a technique of sucking and fixing, onto a suction plate, a board with a protection film affixed thereto, then affixing one long strip-shaped adhesive tape between a pair of diagonal corners on the surface of the board from which the protection film is to be stripped, and pulling up the end of the tape in the state where the back surface of the adhesive tape is pressed by a roller. As the adhesive tape is pulled up while the roller is rotating in the state where the back surface of the tape is pressed, the whole film is stripped. Patent Reference 2 discloses a striping method in which the amount of use of the adhesive tape is reduced and the processing of the protection film subsequent to the stripping is made easier. In this stripping method, first, a pressing roller that presses an adhesive tape is rotated while pressing a part near the center of the edge of the protection film pasted to the glass board, and the edge of the protection film is wound on the pressing roller at a predetermined angle, thus stripping the protection film. Then, the stripped edge of the protection film is nipped and held by a film clamper and the whole protection film is pulled off. It is also disclosed that the stripped protection film is nipped and held by a film catcher and horizontally stacked and housed.

Patent Reference 1: JP-A-9-114384
Patent Reference 2: JP-A-6-278936

DISCLOSURE OF THE INVENTION

Problems that the Invention is to Solve

However, in the above Patent Reference 1, since the long strip-shaped adhesive tape is affixed to substantially the total length on the one diagonal line on the surface of the glass board or the like from which the protection film is to be stripped, there is a problem of large consumption of the tape. Thus, the tape for stripping is replaced frequently in the manufacturing process, causing the lowered operation rate of the manufacture line and the lowered manufacturing speed. Particularly, the replacement of the adhesive tape must be carried out using rubber gloves in a clean room. This is a time-consuming work. Also, since the tape used for stripping the film is wound up with the stripped film, if the film and tape are of different materials, the processing to separately discard them is necessary. There is a problem that the processing is troublesome.

On the other hand, in the above Patent Reference 2, the protection film is wound on the pressing roller and thus stripped, and then it is held by the clamper and stripped. Therefore, if the edge of the protection film is inserted in the glass board or if the edges of the protection films are superimposed on the edge surface of the glass board, the protection film will not be wound on the pressing roller. Thus, stripping failure in the protection film stripping process causes the manufacture line to stop, and it causes a problem that the overall yield of the manufacturing processing is lowered. Moreover, since the series of operations up to housing of the stripped film are carried out by a mechanical device, the mechanism of the whole device is complicated, large-scale and costly.

Moreover, in the above Patent Reference 1 and Patent Reference 2, when the protection film is pasted on both surfaces of the glass board, the stripping of the protection film must be carried out for each surface. Therefore, the stripping process is complicated and the process becomes longer and more costly.

In view of the foregoing problems of the conventional techniques, it is an object of this invention to provide a film stripping method and apparatus that reduces the consumption of the adhesive tape, enables easy and secure stripping of the protection film pasted to both surfaces of the glass board, and efficient film stripping.

Means for Solving the Problems

According to this invention, a film stripping method includes providing an adhesive tape near an edge of a glass board with a protection film pasted on both surfaces thereof and pressing its adhesive surface thereto, separating the adhesive tape adhering to each protection film on both surfaces of the glass board from the surfaces of the glass board and stripping a part of the protection film near the edge of the glass board, holding the stripped edge of the protection film by a chuck of a film chuck device, and moving the glass board so that the protection films on both surfaces are stripped simultaneously by the movement of the glass board. Moreover, in the state where the adhesive tape is slightly sticking out of the edge of a corner of the glass board, the adhesive tape is affixed to the protection film and the adhesive tape is separated from the surface of the glass board.

Also, in the film stripping apparatus, in the state where a part of the protection film is stripped from the glass board, the adhesive tape is separated from the glass board while a part between the protection film and the glass board is blown with air.

The film chuck device is situated near the edge in the direction of width on each of both surfaces of the glass board, and it translates the chuck in a direction of transporting the glass board with respect to a conveyor on which the glass board is set, and moves the glass board in a return direction, thus stripping the protection film.

After the adhesive tape is pressed to the protection film on the glass board, the tension of the adhesive tape in an inward direction of the glass board may be relaxed and then the adhesive tape may be separated from the glass board.

Moreover, according to this invention, a film stripping apparatus includes: an adhesive tape situated near an edge of a glass board with a protection film pasted on both surfaces thereof; a stripping head that is provided on each of both surfaces of the glass board and presses an adhesive surface of the adhesive tape toward the glass board; adhesive tape moving means for separating the adhesive tape adhering to the protection film from the surface of the glass board, and stripping a part of the protection film from the glass board; a film chuck device that holds the stripped edge of the protection film; and stripping means for stripping the protection film held by the film chuck device, from both surfaces of the glass board. The stripping head is so positioned that the adhesive tape can be pasted at a position slightly sticking out of the protection film at one edge of a corner of the glass board.

The stripping head has a pressing maintaining member that is provided to freely press and move the adhesive tape into the direction of the face of the glass board. After the stripping head is abutted against the glass board via the adhesive tape, the pressing maintaining member temporarily holds the glass board when the stripping head retreats, thus preventing the glass board from being lifted up together with the protection film.

The stripping head is provided in such a manner that it can sway where the adhesive tape is pressed to the glass board. The adhesive tape is housed in an adhesive tape cassette unit, and this adhesive tape cassette unit is situated at each of both ends on both surfaces of the glass board.

The film chuck device is provided for each of the adhesive tape cassette units, and the film chuck device is provided to movable relatively to the glass board.

The adhesive tape cassette unit housing the adhesive tape has the stripping head protruding from the adhesive tape cassette unit, and this adhesive tape cassette unit is provided to be attachable and removable integrally with the adhesive tape. Also a tape tension adjusting mechanism is provided that relaxes the tension of the adhesive tape in an inward direction of the glass board in the state where the stripping head is pressed to the protection film on the glass board.

The film stripping apparatus has air blowing means that blows a part between the protection film and the glass board with air in the state where a part of the protection film is stripped by the adhesive tape. Moreover, the air blowing means is provided to be movable along one side of the board. It expands, over the one side of the board, the stripping of the protection film stripped at the corner of the board by the stripping head.

ADVANTAGE OF THE INVENTION

According to the film stripping method and apparatus of this invention, the protection film can be securely stripped from the glass board, irrespective of the state of the edge of the protection film. Also, the consumption of the adhesive tape is less, the replacement cycle of the adhesive tape is longer, and the frequency of maintenance of the apparatus itself can be extremely less. Moreover, the protection film pasted on both surfaces of the glass board can be securely stripped simultaneously by the simple apparatus and in the short process, thus realizing high work efficiency.

DESCRIPTION OF REFERENCE NUMERALS AND SIGNS 2 film stripping apparatus
4, 5, 7a, 7b roller conveyor
6 glass board
20 stripping processing unit
22 antistatic blower
28 adhesive tape cassette unit
30 adhesive tape
31 feed reel
32 take-up reel
34 guide roller
38 adhesive surface
40 stripping head
46 actuator
48 running rail
54 protection film
56 chuck
58 film chuck device

BEST MODE FOR CARRYING OUT THE INVENTION

Hereinafter, a first embodiment of a film stripping method and apparatus according to this invention will be described with reference to FIG. 1 to FIG. 4. The film stripping apparatus of this embodiment is an apparatus that strips a protection film affixed to prevent damage to a large glass board used for a liquid crystal display.

The configuration of a film stripping apparatus 2 of this embodiment will be described. In the film stripping apparatus 2, an intake unit 10 having a roller conveyor 4 is provided, which is on the left end of FIG. 1. The intake unit 10 has a board receiving device 8 capable of rising and falling and that is above the roller conveyor 4 at the position to take in a glass board 6 and receives the glass board 6 from a carry-in device, not shown. Above the intake unit 10, a take-out unit 12 is provided that is supported by a supporting structure, not shown, and that sends the glass board 6 to the next process. The take-out unit 12 has a roller conveyor 5 and has a board receiving device 9 capable of rising and falling and that raises the glass board 6 slightly from the roller conveyor 5 and supporting the glass board 6 above the roller conveyor 5.

Figure 1:
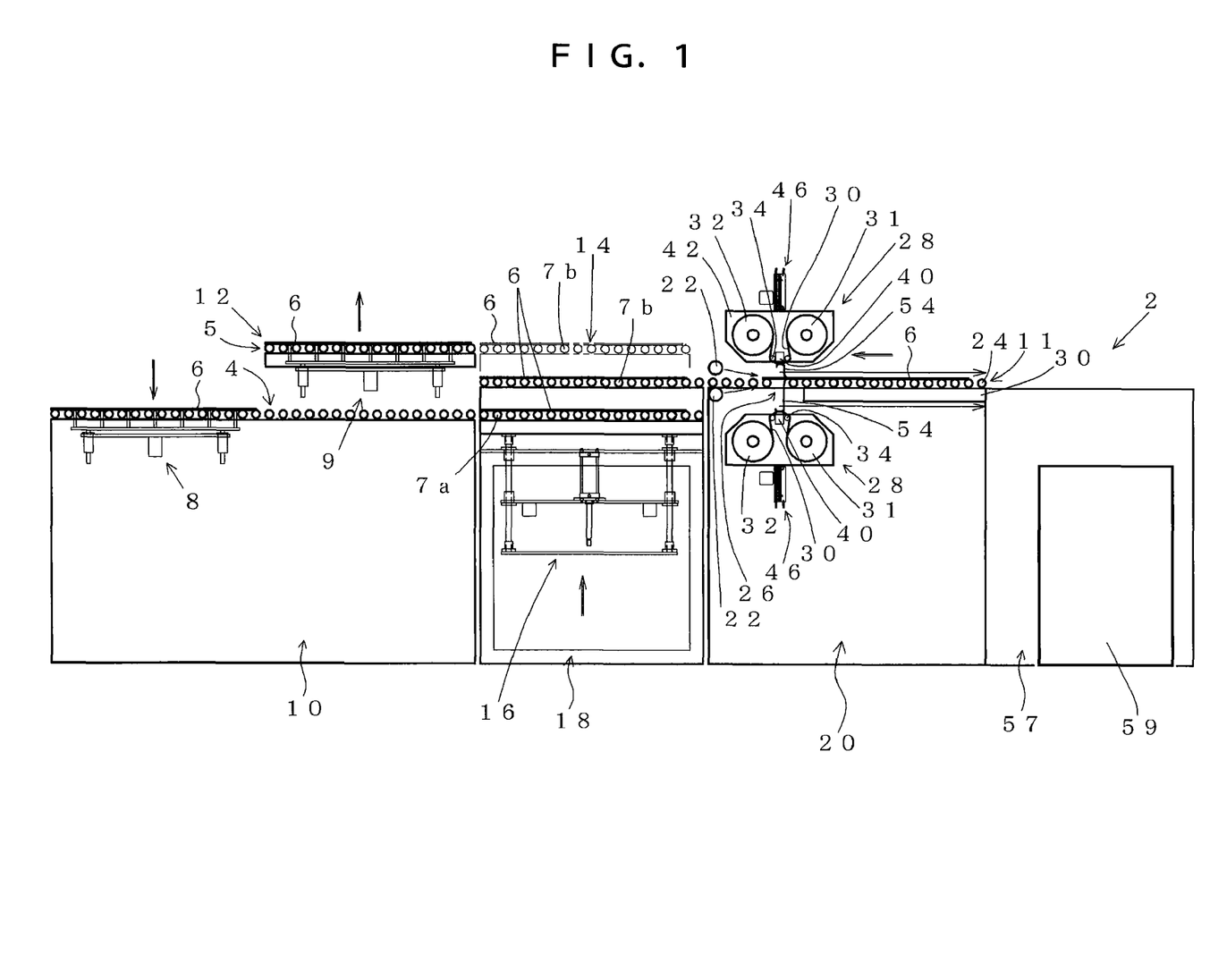
FIG. 1 is a right side view of a film stripping apparatus according to a first embodiment of this invention.

On the right of the intake unit 10 in the drawing, a lift member 14 is provided in which two stages of roller conveyors 7a, 7b are arranged at a predetermined spacing, and a connecting unit 18 is situated that has a lifter 16 capable of lifting and lowering the lift member 14 to the heights of the two stages. With respect to the heights of the two stages of the lift member 14, first, in the lowered state, the lower roller conveyor 7a is at the same height as the roller conveyor 4 of the intake unit 10, and the upper roller conveyor 7b is at the same height as a roller conveyor 11 of a stripping processing unit 20, which will be described later. Next, in the lifted state, the lower roller conveyor 7a is at the same height as the roller conveyor 11 of the stripping processing unit 20, which will be described later, and the upper roller conveyor 7b is at the same height as the roller conveyor 5 of the take-out unit 12.

On the right of the connecting unit 18 in the drawing, the stripping processing unit 20 is provided. The stripping processing unit 20 has the roller conveyor 11 that sends the glass board 6 in and out. On the send-in/out side of the glass board 6, a pair of antistatic blowers 22 is installed at vertically symmetrical positions with the roller conveyor 11 situated between them. At a part where the left end of the glass board 6 is situated on the roller conveyor 11 of the stripping processing unit 20 in the state where the glass board 6 is sent into the right side of the stripping processing unit 20 in the drawing by the roller conveyor 11, a gap 26 having no roller 24 is formed. Above and below this gap 26, each pair of adhesive tape cassette units 28 is arranged in a vertically symmetrical manner with the roller conveyor 11 situated between them, near both ends of the roller 24 of the roller conveyor 11.

Next, the adhesive tape cassette unit 28 will be described. The adhesive tape cassette unit 28 has a feed reel 31 and a take-up reel 32 for an adhesive tape 30. The adhesive tape 30 sent out from the feed reel 31 passes a guide roller 34. Its tape back surface 38, which is not an adhesive surface 36, contacts a stripping head 40, and it changes the direction. The tape passes another guide roller 34 and is wound on the take-up reel 32. These members are housed in a substantially rectangular plate-like case 42, but the stripping head 40 is situated to be protruding so that the adhesive surface 36 of the adhesive tape 30 will protrudes outside of the case 42.

Figure 2:
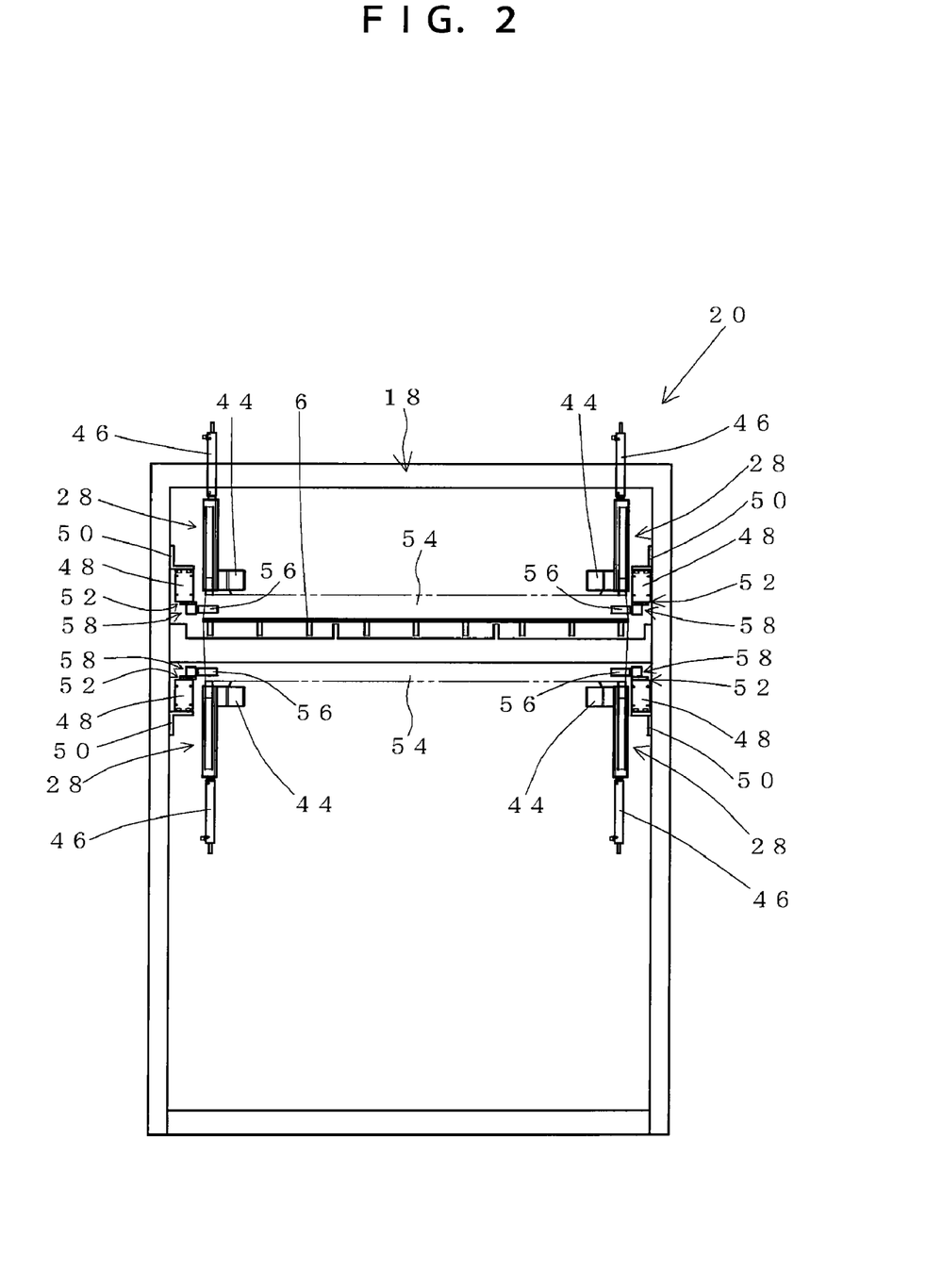
FIG. 2 is front view of a stripping processing unit of the film stripping apparatus according to the first embodiment of this invention.

As shown in FIG. 2, a motor 44 that rotates the take-up reel 32 is connected to the adhesive tape cassette unit 28 via a driving connection mechanism, not shown. Moreover, at the position where the stripping head 40 coincides with the gap 26 of the roller conveyor 11, an actuator 46 including a motor, cylinder mechanism and the like is provided. The actuator 46 is fixed by a supporting part, not shown, and the adhesive tape cassette unit 28 is so attached that it can be lifted and lowered vertically by the actuator 46. Moreover, the adhesive tape cassette unit 28 is provided to be integrally attachable to and removable from the motor 44, the actuator 46 and the like, and so that the adhesive tape 30 can be easily replaced by the adhesive tape cassette unit 28.

On the inner surface of an armor near of both ends of the roller of the roller conveyor 11 of the stripping processing unit 20, running rails 48 are attached respectively to the stripping processing unit 20 via a supporting member 50, in a vertically symmetrical manner with the roller conveyor 11 situated between them, and parallel to the transporting direction of the roller conveyor 11. On a lateral surface 52 of each running rail 48 facing the roller conveyor 11, a film chuck device 58 having a chuck 56 capable of nipping and holding a protection film 54 is provided. This film chuck device 58 is provided to be movable parallel to the transporting direction of the roller conveyor 11, along the running rail 48.

On the right of the stripping processing unit 20 in the drawing, a film storage unit 57 having a film storage 59 that houses the stripped protection film 54 is arranged.

Next, the operation of this film stripping apparatus 2 will be described. First, one glass board 6 of the plural superimposed glass boards is carried into the intake unit 10 by a carry-in device, not shown. The protection film 54 has been affixed to both sides of the glass board 6 that has been carried in, and the glass board 6 in this state is supported above the roller conveyor 4 by the board receiving device 8, and it is set on the roller conveyor 4 as the board receiving device 8 is lowered. Next, the glass board 6 is sent out toward the lift member 14 of the connecting unit 18 by the roller conveyor 4 of the intake unit 10. In this case, the lifting state of the lifter 16 is at the lower stage, and the glass board 6 is set on the roller conveyor 7a. Then, the lifter 16 raises the lift member 14 with the glass board 6 set thereon to the upper stage, and the glass board 6 is sent out to the stripping processing unit 20 by the roller conveyor 7a.

Figure 3:
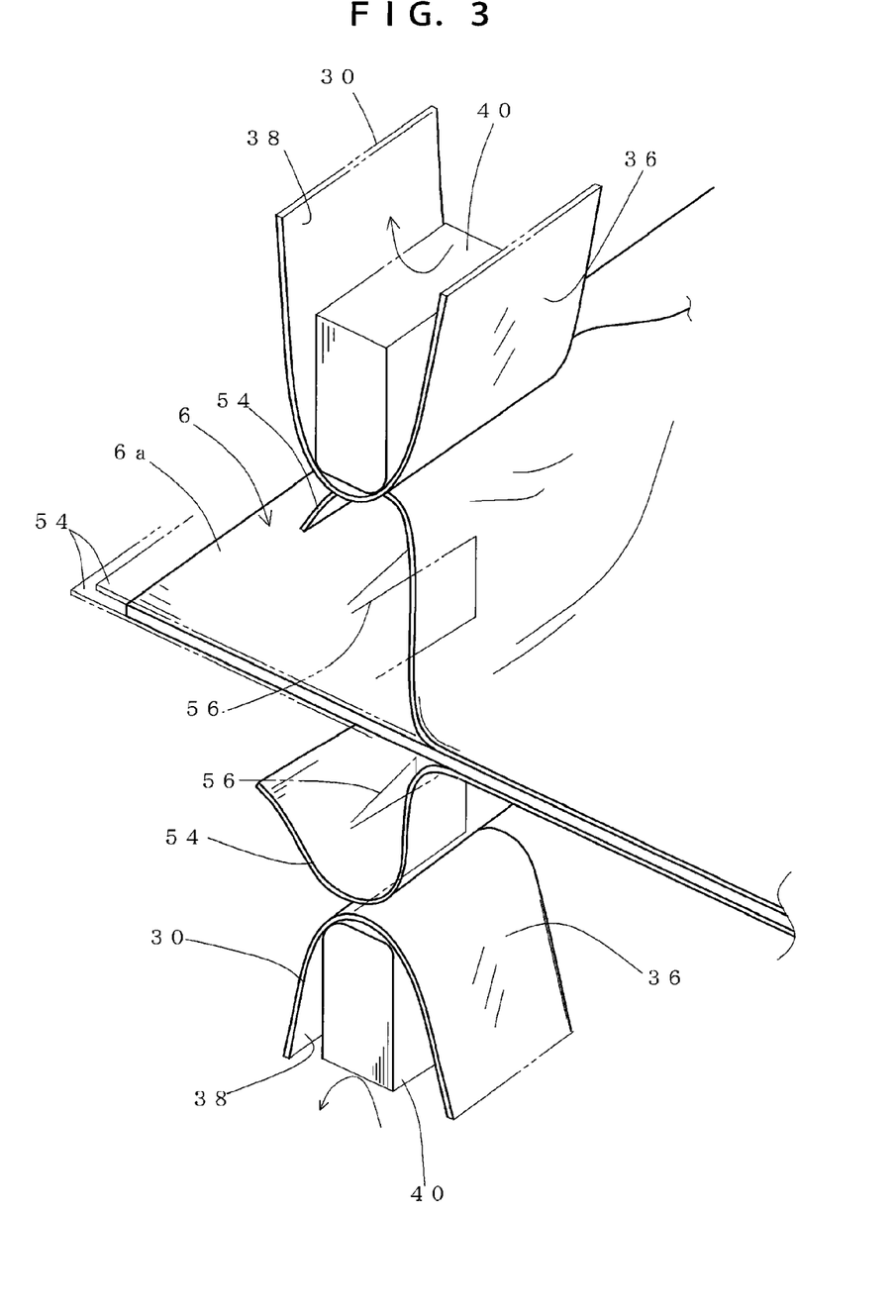
FIG. 3 is a partial perspective view showing a stripping state by the film stripping apparatus according to the first embodiment of this invention.

In the stripping processing unit 20, the glass board is moved by the roller conveyor 11 until one end of the glass board 6 reaches the right end of the drawing. The film end is blown with air by the antistatic blower 22 to remove static electricity. Next, the adhesive tape cassette units 28 facing both sides of the glass board 6 are simultaneously brought closer to the glass board 6 by the respective actuators 46. Then, the adhesive surface 36 of the adhesive tape 30 is pressed to the surface of the protection film 54 on the glass board 6 by the stripping head 40 of the adhesive tape cassette unit 28. The adhesive tape cassette unit 28 below the roller conveyor 11 is brought in contact with the protection film 54 on the back side of the glass board 6 through the gap 26 of the roller conveyor 11. The position of each stripping head 40 in this case is set to such a position that the adhesive tape 30 will be slightly protruding from the edge of the protection film 54 with respect to the corner edge 6a of the glass board 6, as shown in FIG. 3.

The stripping head 40 of the adhesive tape cassette unit 28 is moved away from the glass board 6 in a perpendicular direction by the actuator 46. Then, with the protection film 54 adhering to the adhesive surface 36 of the adhesive tape 30, the protection film 54 adhering to the adhesive tape 30 is pulled off the glass board 6 together with the stripping head 40, as shown in FIG. 3. Then, the edge of the protection film 54 stripped at both ends in the direction of width of the glass board 6 is nipped and held by the chuck 56 of the film chuck device 58.

Next, the film chuck device 58 moves to the right in FIG. 1, along the running rail 48. Thus, the protection film 54 adhering to the adhesive surface 36 of the adhesive tape 30 is pulled off. At the same time, the glass board 6 is moved to the left in the drawing by the roller conveyor 11. In this case, the glass board 6 moves from the roller conveyor 11 of the stripping processing unit 20 to the roller conveyor 7b on the left side at such a speed that the stripping position of the protection film 54 coincides with the gap 26 of the roller conveyor 11. After a while, when the glass board 6 has completed its movement to the lift member 14 of the connecting unit 18, the stripping of the protection film 54 is completed, too. The film chuck device 58 moved to the right end of the running rail 48 in the drawing cancels the nipping and holding, and drops the protection film 54 into the film storage 59.

The supply of the adhesive tape of the adhesive tape cassette unit 28 will be described. After the protection film 54 adhering to the adhesive tape 30 is pulled off by the film chuck device 58, the adhesive tape take-up reel 32 winds up the contact surface part to the stripping head 40 and rotates so that the new adhesive surface 36 will be situated at the end of the stripping head 40.

In the lift member 14 of the connecting unit 18 on which the glass board 6 has been set, the glass board 6 is lifted to the upper stage by the lifter 16 and is sent out to the take-out unit 12 by the roller conveyor 7b. In the take-out unit 12, the board receiving device 9 rises and raises the glass board 6 on the roller conveyor 5 slightly further, and the glass board 6 is away from the roller conveyor 5. In this state, the glass board 6 is transported out by a transport device, not shown. The series of operations to strip the protection film 54 on the glass board 6 is complete.

Next, the movement of the glass board 6 by the two stages of roller conveyors 7a, 7b in the connecting unit 18 will be described. When the glass board 6 with the protection film 54 affixed thereon is carried from the roller conveyor 4 of the intake unit 10 to the lower roller conveyor 7a, the glass board 6 from which the film has been stripped by the stripping processing unit 20 is carried into the upper roller conveyor 7b. After that, when the lift member 14 is lifted by the lifter 16 and the glass board 6 on the lower roller conveyor 7a is sent to the stripping processing unit 20, the glass board 6 situated on the upper roller conveyor 7b and having the protection film 54 stripped off is moved to the roller conveyor 5 of the board receiving device 9. As this operation is repeated, stripping of the film is carried out efficiently.

Figure 4:
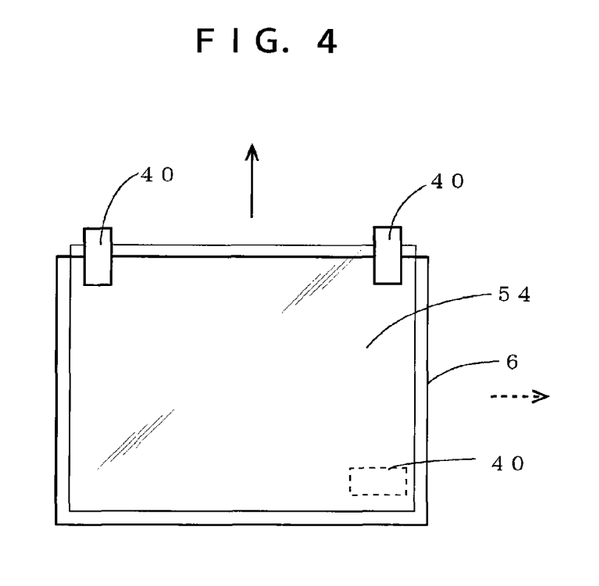
FIG. 4 is a plan view showing a glass board with a film affixed thereto according to the first embodiment of this invention.

In the film stripping apparatus 2 of this embodiment, since the protection film 54 is stripped simultaneously from both sides of the glass board 6 by the stripping processing unit 20, reversing the side of the glass board 6 or the like is not necessary and it is efficient. Moreover, the stripping head 40, when carrying out stripping, may be adhered to the side where the edge of the protection film 54 is exposed and the part situated inside, other than the lateral edge of the glass board 6 on the side where the edge of the protection film 54 is sticking out, as shown in FIG. 4. In this case, the stripping is carried out from the side where the edge of the protection film 54 is sticking out. This makes it possible to select either the short-side direction or the long-side direction as the feeding direction of the glass board 6, and the limitation to the process can be eliminated. Particularly when stripping the protection film for the large glass board 6, the movement in the longitudinal direction realizes better space efficiency. Also, since the glass board 6 is sent to the connecting unit 18 at the same time as the stripping of the protection film 54, no wasteful movement is made and the processing time is short.

Moreover, the processing is easy because it is different from the technique of adhering the adhesive tape 30 to the total length of the protection film 54 and then pulling the film off. The adhesive tape 30 used when stripping the edge of the protection film 54 is adhered as it is slightly sticking out from the edge of the protection film 54, and the protection film 54 is pulled off. Therefore, air enters the edge part of the protection film 54 and it can easily be lifted. The protection film 54 is pulled off securely. Moreover, since only the area corresponding to the end surface of the stripping head 40 is used, a small amount of the adhesive tape 30 suffices and the cost can be restrained.

Moreover, the adhesive tape 30 is integrally replaceable and easily attachable and removable by the adhesive tape cassette unit 28. It can be easily replaced even in the state where the operator is wearing gloves in the clean room. Also, since the protection film 54 that is pulled off is housed into the film storage 59, the film processing is not troublesome.

Figure 5:
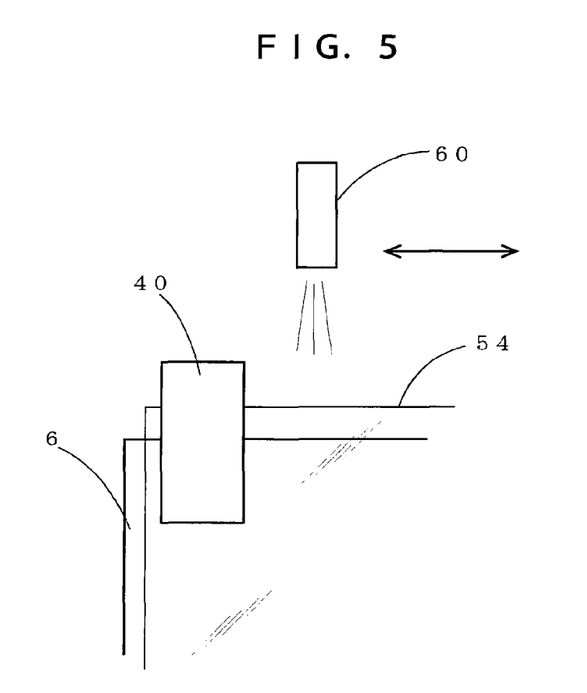
FIG. 5 is a partial plan view showing stripping of a film by a film stripping apparatus according to a second embodiment of this invention.

Next, a second embodiment of the film stripping apparatus of this invention will be described with reference to FIG. 5 to FIG. 7. Here, the same members as in the above embodiment are denoted by the same reference numerals. In this embodiment, the protection film 54 is pasted in a state where a part thereof is sticking out on one side of the glass board 6, as shown in FIG. 5. In the case of stripping the protection film 54 that is pasted in this manner, the stripping head 40 is situated above the lateral edge where the protection film 54 is sticking out, and it is arranged so that a part of the stripping head 40 and the adhesive tape 30 in the abutted state will stick out from the lateral edge of the glass board 6. Also, between a pair of stripping heads 40, an air scraper 60 is provided that is movable between the stripping heads 40 near the lateral edge of the glass board 6.

The stripping head 40 of the film stripping apparatus 2 of this embodiment has a stick-like pressing maintaining member 62 provided to be capable of pressing and moving the adhesive tape 30 in the surface direction of the glass board 6. The pressing maintaining member 62 is for temporarily holding the glass board 6 and preventing the glass board 6 from being lifted together with the protection film 54 when the stripping head 40 retreats after abutting against the glass board 6 via the adhesive tape 30.

Hereinafter, the operation of the film stripping apparatus 2 of this embodiment will be described. First, one glass board 6 of the plural superimposed glass boards is carried in by a carry-in device, not shown, and the glass board is transferred to the stripping processing unit 20. The transfer method is the same as in the above embodiment and therefore will not be described further in detail. Next, when stripping the protection film 54, the adhesive tape cassette unit 28 facing the glass board 6 is moved toward the glass board 6, as shown in FIG. 6(*a*). Then, as shown in FIG. 6(*b*), the adhesive surface 36 of the adhesive tape 30 is pressed to the surface of the protection film 54 on the glass board 6 by the stripping head 40 of each adhesive tape cassette unit 28.

Figure 6:
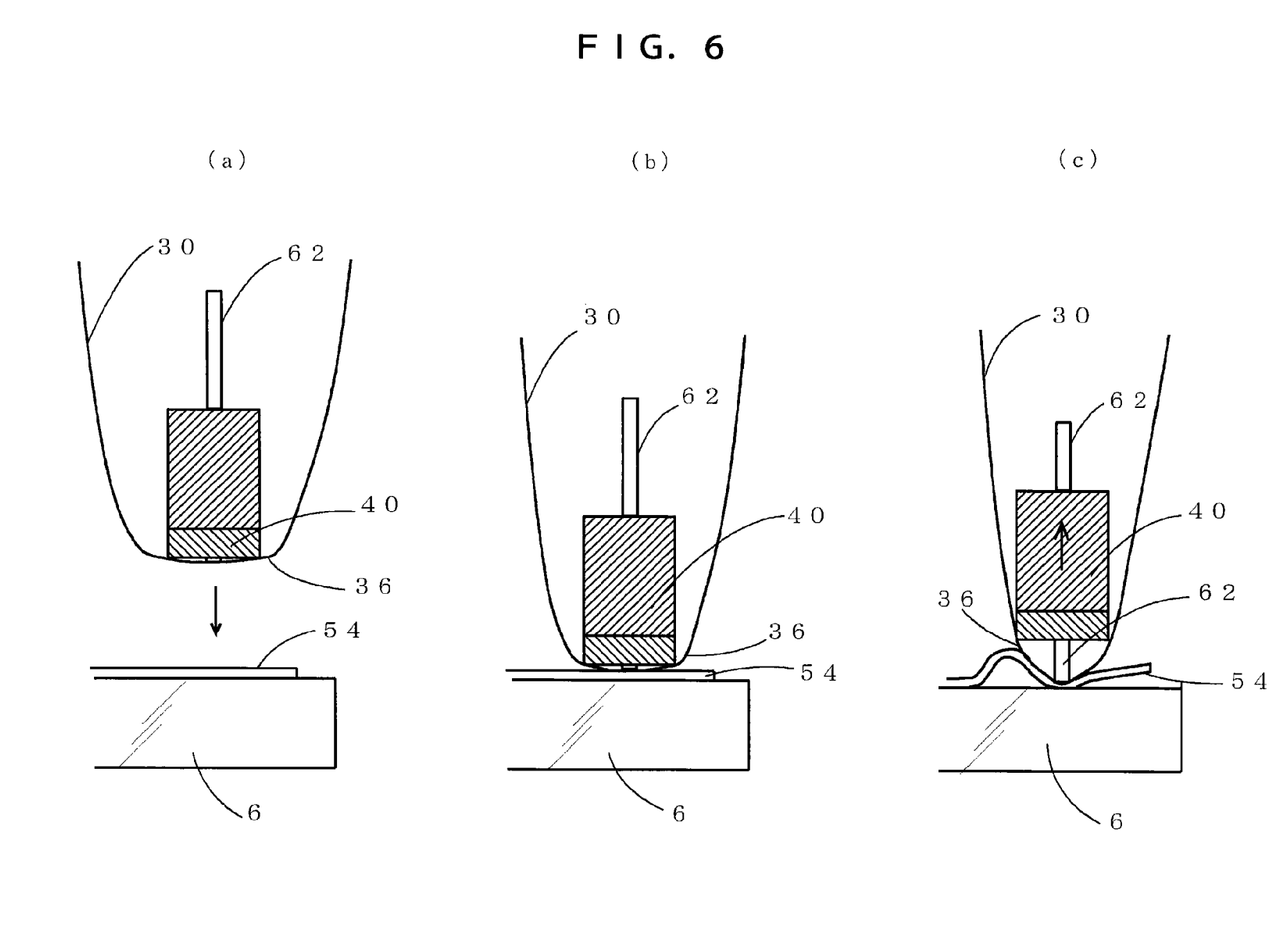
FIG. 6 is a partial front view showing a process of stripping a film by the film stripping apparatus according to the second embodiment of this invention.
Figure 7:
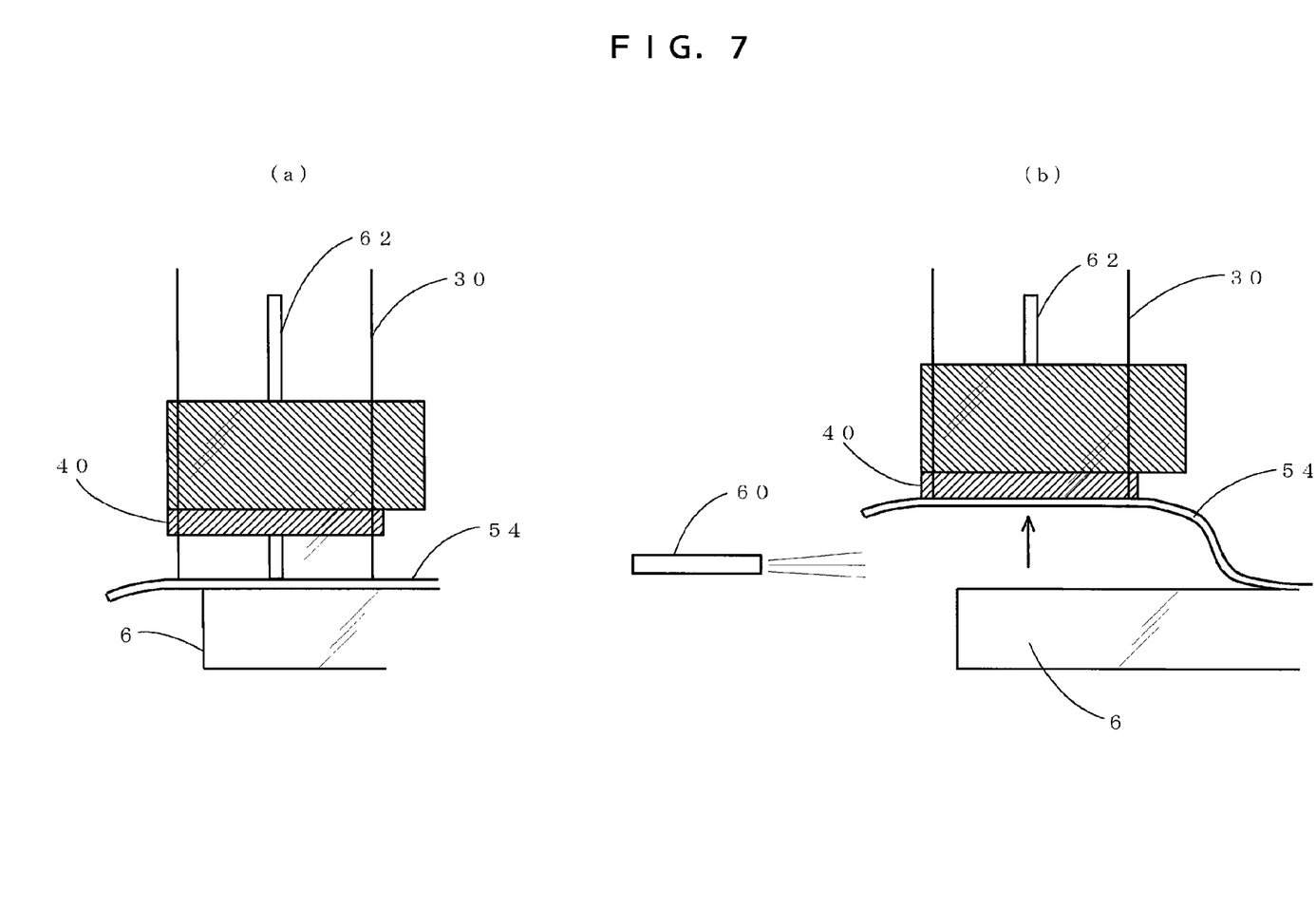
FIG. 7 is a partial right side view showing a process of stripping a film by the film stripping apparatus according to the second embodiment of this invention.

Next, as shown in FIG. 6(*c*) and FIG. 7(*a*), the stripping head 40 together with the adhesive tape 30 is moved away from the surface of the glass board 6, and the pressing maintaining member 62 is temporarily pressed to the glass board 6 via the adhesive tape 30. Thus, the stripping head 40 moves and the protection film 54 together with the adhesive surface 36 of the adhesive tape 30 is partly lifted. However, since the glass board 6 is held by the pressing maintaining member 62, the glass board 6 is prevented from being lifted when the adhesive tape 30 is lifted.

After that, as the pressing maintaining member 62 is caused to retreat and the adhesive tape 30 is abutted against the stripping head 40, also the protection film 54 is pulled toward the lower surface of the stripping head 40, as shown in FIG. 7(*b*). Then, the air scraper 60 in an air injecting state is moved between a pair of stripping heads 40. The end of the protection film 54 is securely stripped off the surface of the glass board 6, and the protection film 54 is held by the chuck as in the above embodiment and is thus pulled off the surface of the glass board 6.

In the film stripping apparatus 2 of this embodiment, the glass board 6 itself can be prevented from being lifted when stripping the protection film 54 from the glass board 6, and the protection film 54 can be neatly stripped without causing distortion or any other influence on the glass board 6. Also, as the stripped part of the protection film 54 that is stripped at the edge is blown with air by the air scraper 60, the protection film 54 is stripped off the glass board 6 easily and securely.

Next, a third embodiment of a film stripping apparatus of this invention will be described with reference to FIG. 8 and FIG. 9. Here, the same members as in the above embodiments are denoted by the same reference numerals. In this embodiment, the stripping head 40 of the film stripping apparatus 2 is bisected into pressing parts 40a, 40b in such a manner that they can independently rise and fall. On both sides of the stripping head 40, roller members 41, 43 are separately provided. In this embodiment, the pressing part 40a causes the protection film 54 to adhere to the adhesive tape 30, and the pressing part 40b functions as the pressing maintaining member of the above embodiment.

Also in the operation of the film stripping apparatus 2 of this embodiment, as in the above embodiments, one glass board 6 of the plural superimposed glass boards is carried in by a carry-in device, not shown, and when stripping the protection film 54 by the stripping processing unit 20, first, the adhesive tape cassette unit 28 facing the glass board 6 is moved toward the glass board 6. Then, as shown in FIG. 8(a), the adhesive surface 36 of the adhesive tape 30 is pressed to the surface of the protection film 54 on the glass board 6 by the stripping head 40 of each adhesive tape cassette unit 28.

Figure 8:
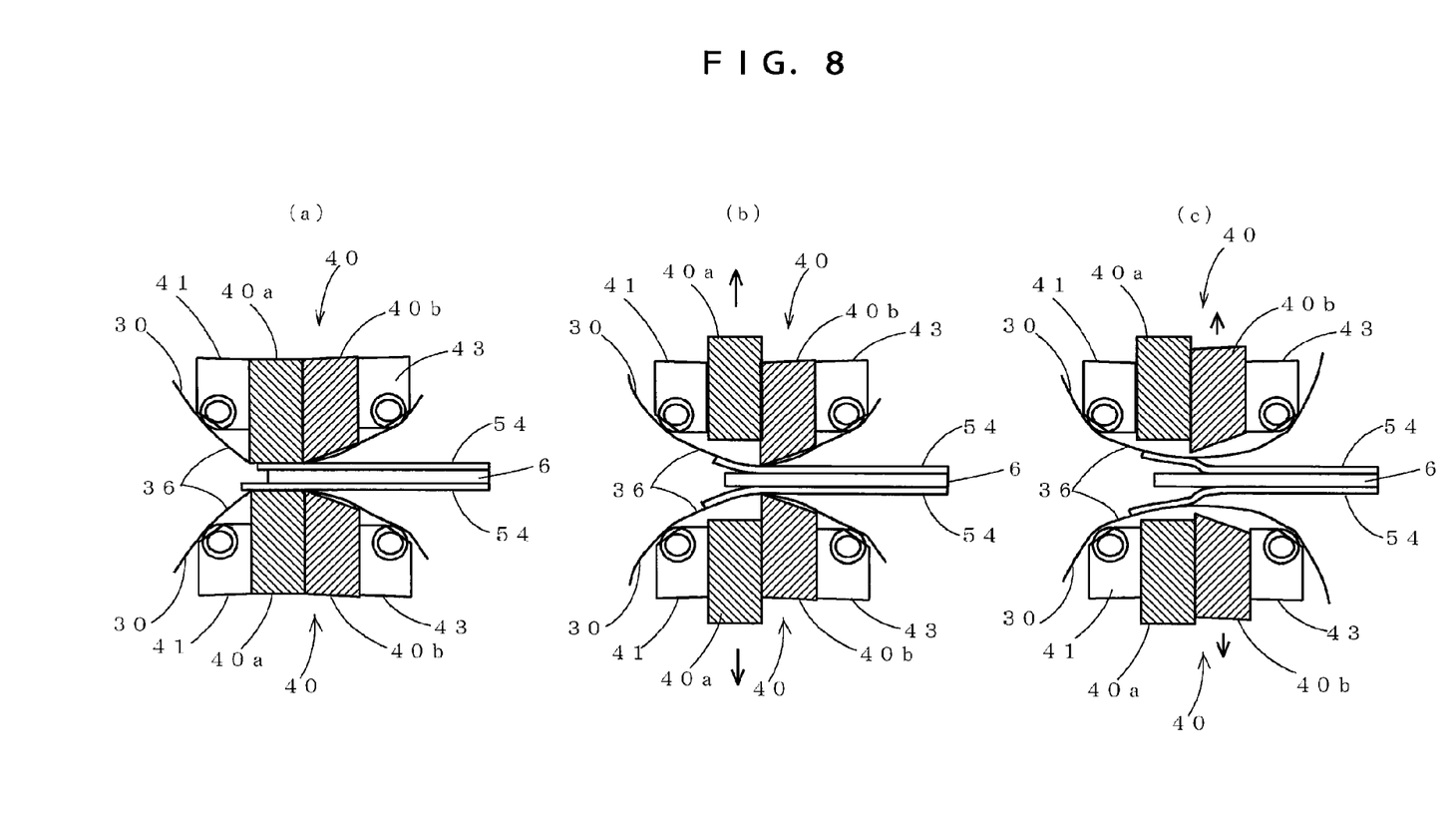
FIG. 8 is a front view showing a process of stripping a film by a film stripping apparatus according to a third embodiment of this invention.
Figure 9:
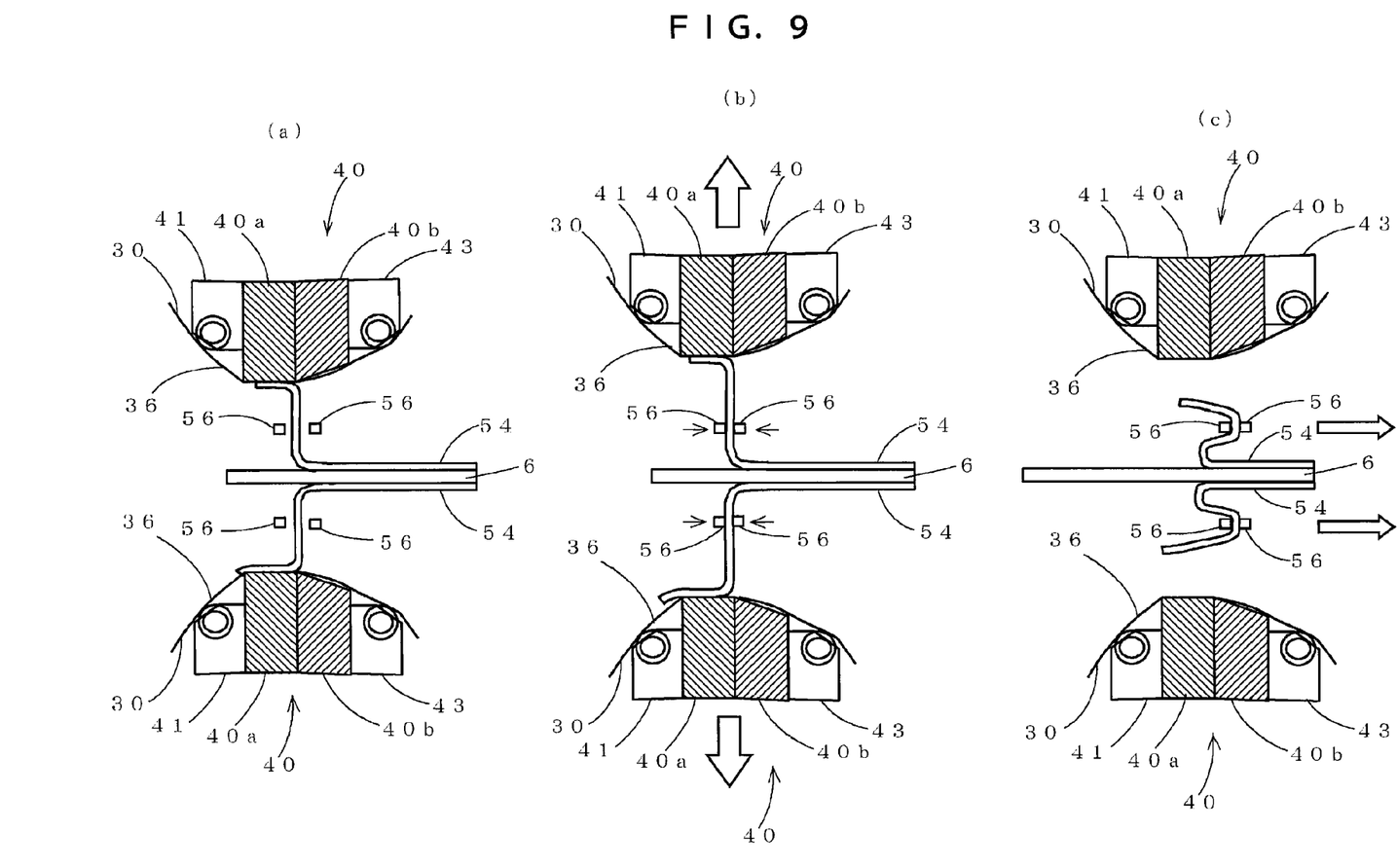
FIG. 9 is a partial front view showing a next process of stripping of a film by the film stripping apparatus according to the third embodiment of this invention.

Next, as shown in FIG. 8(b), the divided part 40a of the stripping head 40 is moved away from the glass board 6. Thus, the protection film 54 together with the adhesive tape 30 is partly lifted from the surface of the glass board 6. In this case, however, the state where the glass board 6 is pressed via the adhesive tape 30 and the protection film 54 is maintained by the divided part 40b. This prevents the glass board 6 from being lifted along with the movement of the divided part 40a of the stripping head 40.

After that, as the divided part 40b of the stripping head 40 is caused to retreat and the adhesive tape 30 is pulled toward the stripping head 40, also the protection film 54 adhering to the adhesive surface 36 is pulled toward the end surface of the stripping head 40, as shown in FIG. 8(c). Moreover, the stripping head 40 is moved away from the glass board 6, as shown in FIG. 9(a), and the protection film 54 is held by the chuck 56 of the film chuck device, as shown in FIG. 9(b). After that, the chuck 56 of the film chuck device is moved relatively in the direction of stripping the protection film 54, and the protection film 54 is securely stripped off the surface of the glass board 6.

In the film stripping apparatus 2 of this embodiment, when stripping the protection film 54 from the glass board 6, the glass board 6 itself can be prevented from being lifted, and the protection film 54 can be neatly stripped without causing distortion or any other influence on the glass board 6.

Next, a fourth embodiment of a film stripping apparatus of this invention will be described with reference to FIG. 10 and FIG. 11. Here, the same members as in the above embodiments are denoted by the same reference numerals. The film stripping apparatus 2 of this embodiment has the stripping head 40 and the roller members 41, 43 on both sides thereof, and a tape tension adjusting mechanism 45 is provided upstream of the roller member 43 in the tape feeding direction. The tape tension adjusting mechanism 45 has a tension adjusting roller on the tape send-out side, and this roller is adjustable in position in a direction that intersects the tape feeding direction. It may also be carried out by controlling a feed motor on the tape feeding side.

In the operation of the film stripping apparatus 2 of this embodiment, as in the above embodiments, one glass board 6 of the plural superimposed glass boards is carried in by a carry-in device, not shown, and when stripping the protection film 54 by the stripping processing unit 20, first, the adhesive tape cassette unit 28 facing the glass board 6 is moved toward the glass board 6. Then, as shown in FIG. 10(a), the adhesive surface 36 of the adhesive tape 30 is pressed to the surface of the protection film 54 on the glass board 6 by the stripping head 40 of each adhesive tape cassette unit 28.

Figure 10:
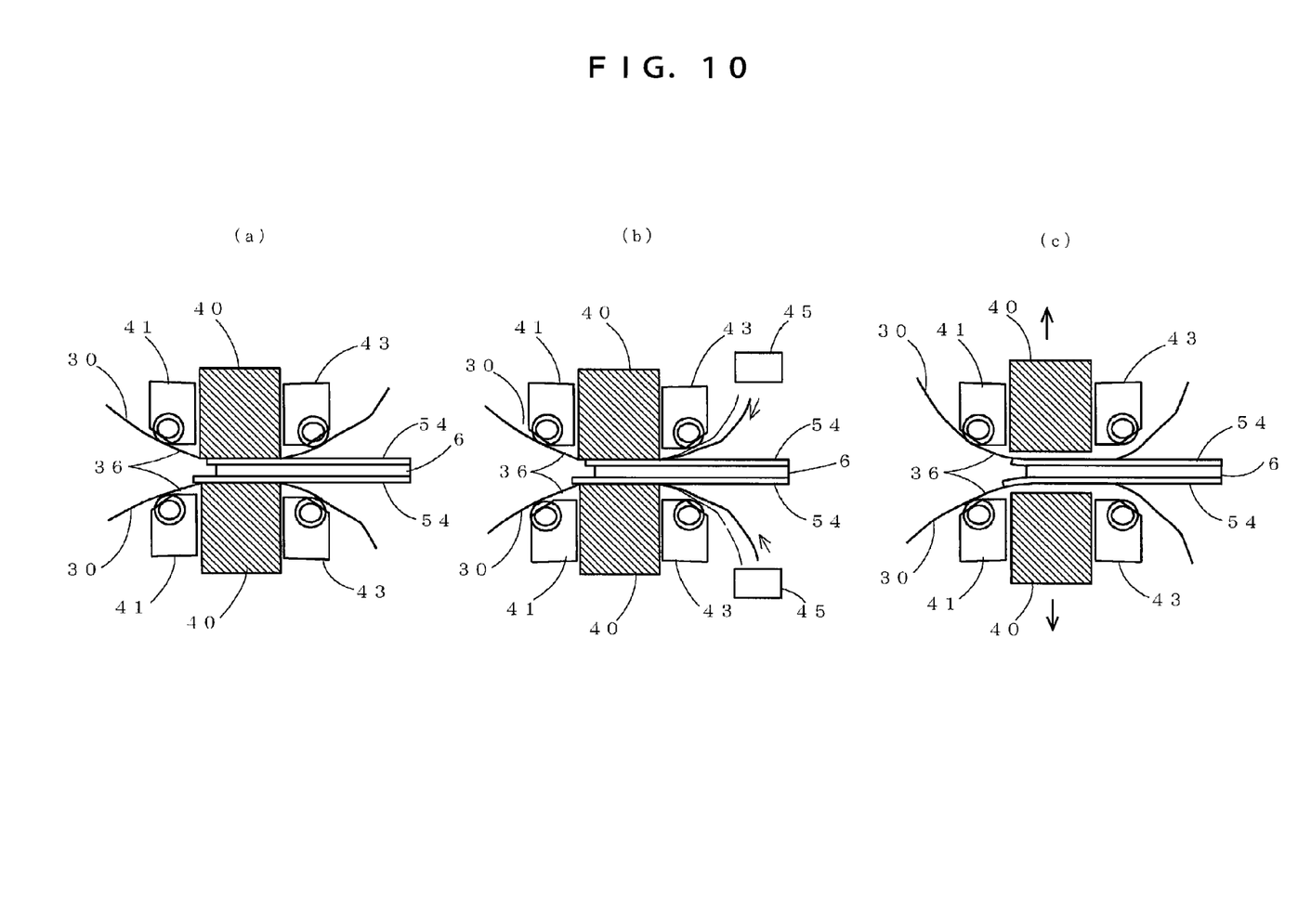
FIG. 10 is a front view showing a process of stripping a film by a film stripping apparatus according to a fourth embodiment of this invention.

Next, the adhesive tape 30 on the inner side, not on the edge of the glass board 6, is flexed by a predetermined amount by the tape tension adjusting mechanism 45, as shown in FIG. 10(b). After that, a pair of stripping heads 40 is caused to retreat from the glass board 6, as shown in FIG. 10(c). In this case, the adhesive tape 30 on the flexed side delays in movement by the amount of flexure when the stripping head 40 retreats, and the protection film 54 on the edge of the glass board 6 is lifted first together with the stripping head 40. After this, the stripping head 40 is moved further away from the glass board 6, and the adhesive tape 30 is pulled toward the stripping head 40, as shown in FIG. 11 (a). Thus, also the protection film 54 is pulled toward the end surface of the stripping head 40. Next, the protection film 54 is held by the chuck 56 of the film chuck device, as shown in FIG. 11(b). Then, the chuck 56 of the film chuck device is moved relatively in the direction of stripping the protection film 54, and the glass board 6 is moved in the opposite direction. The protection film 54 is securely stripped off the surface of the glass board 6.

In the film stripping apparatus 2 of this embodiment, when stripping the protection film 54 from the glass board 6, with the simple structure, the glass board 6 itself is prevented from being lifted and the protection film 54 can be neatly stripped without causing distortion or any other influence on the glass board 6.

Figure 12:
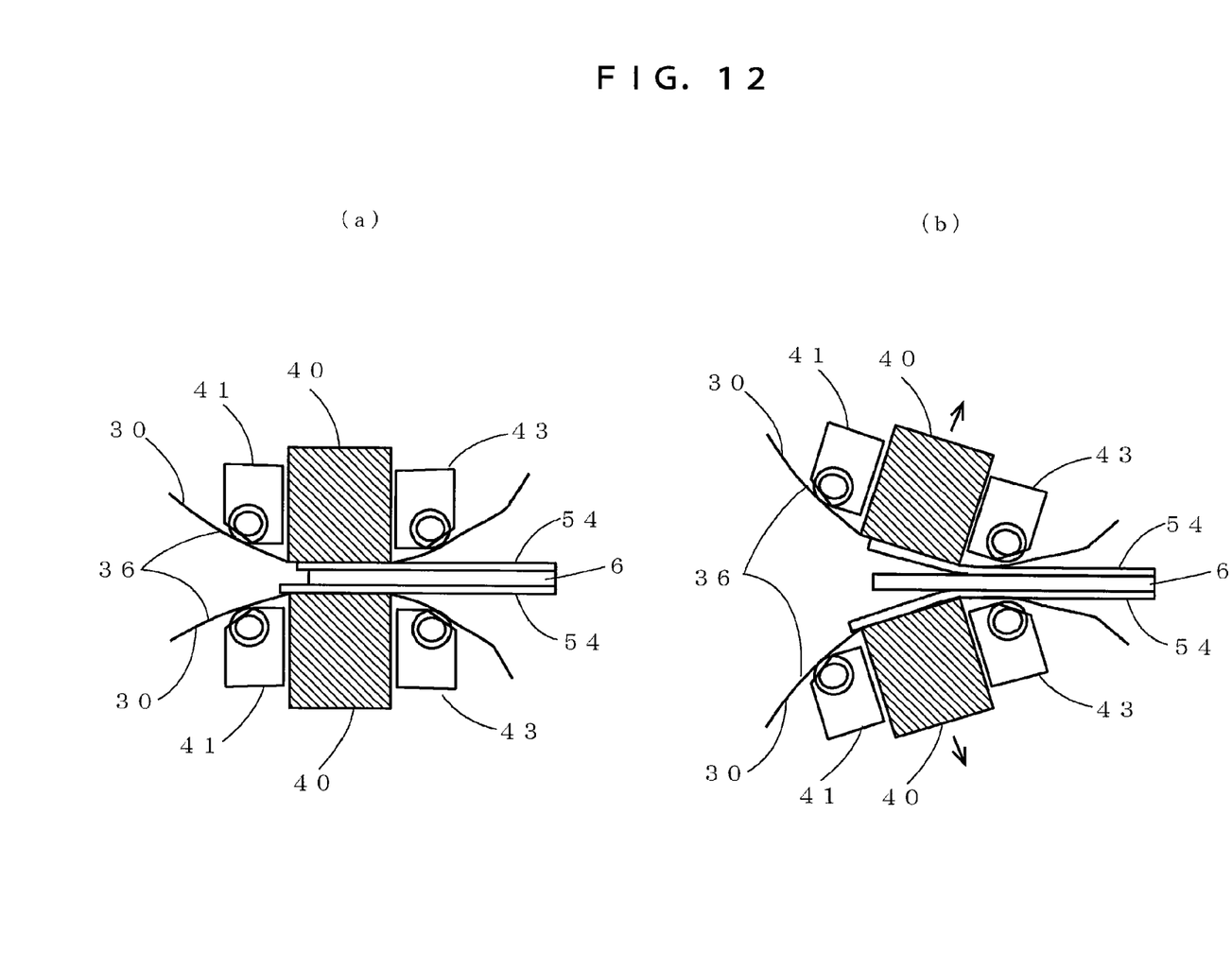
FIG. 12 is a front view showing a process of stripping a film by a film stripping apparatus according to a fifth embodiment of this invention.

Next, a fifth embodiment of a film stripping apparatus of this invention will be described with reference to FIG. 12. Here, the same members as in the above embodiments are denoted by the same reference numerals. In this embodiment, the stripping head 40 of the film stripping apparatus 2 is provided to be capable of swaying in the film stripping direction together with the roller members 41, 43 on both sides thereof. In this embodiment, after the stripping head 40 is abutted against the glass board 6 via the adhesive tape 30 and the protection film 54 is adhered to the adhesive tape 30 by the stripping head 40, as shown in FIG. 12(a), the stripping head 40 and the roller members 41, 43 sway in the stripping direction from the edge of the protection film 54, as shown in FIG. 12 (b). Thus, the edge of the protection film 54 is stripped in the state where the glass board 6 is held by the roller member 43.

Figure 11:
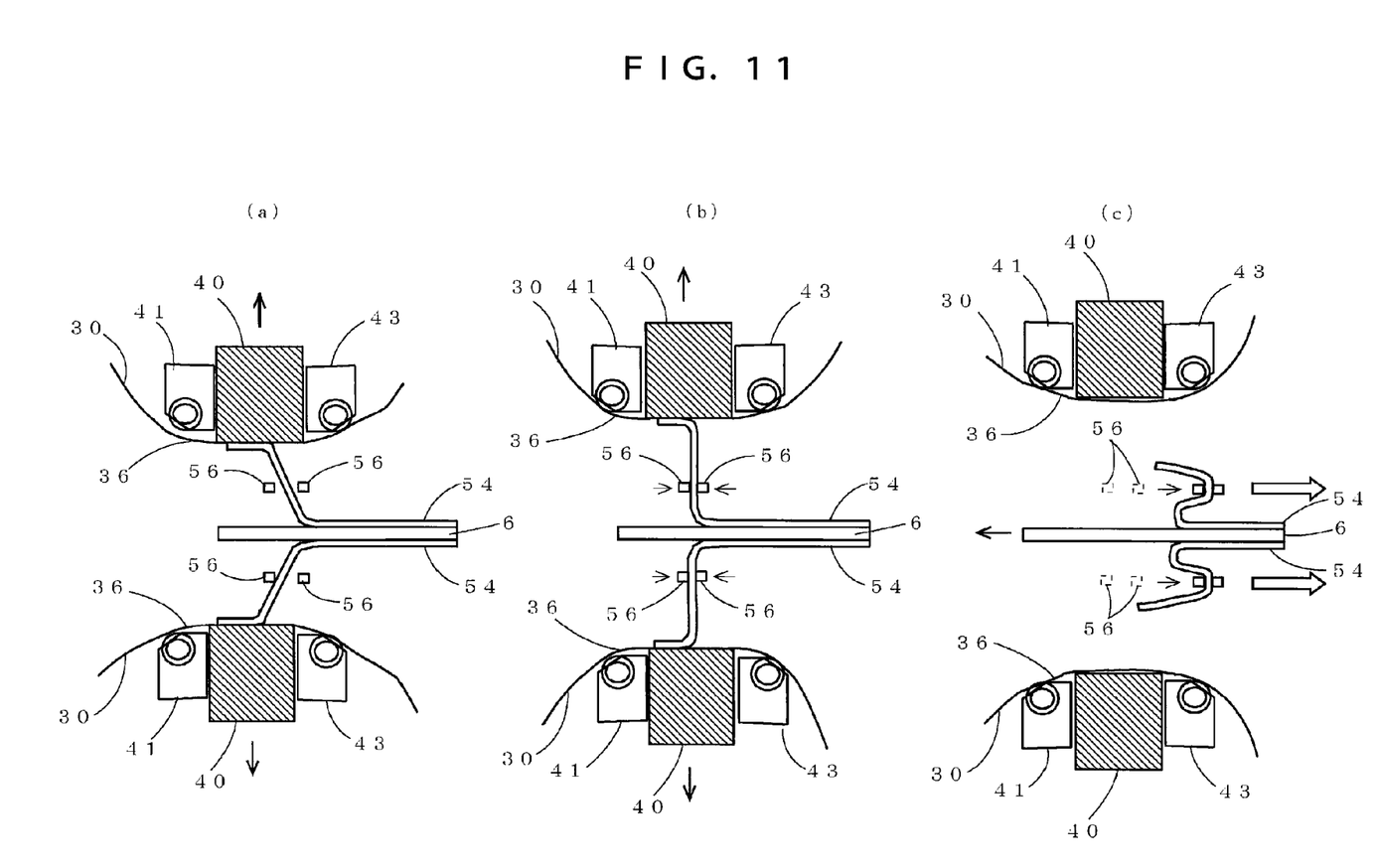
FIG. 11 is a partial front view showing a next process of stripping a film by the film stripping apparatus according to the fourth embodiment of this invention.

After that, as in the above embodiment, when the stripping head 40 moves away from the glass board 6, as shown in FIG. 11 (a), the edge of the protection film 54 is stripped from the glass board 6, and the protection film 54 is held by the chuck 56 and the protection film 54 can be securely stripped off the glass board 6, as shown in FIGS. 11(b) and (c).

The film stripping apparatus of this invention is not limited to the above embodiments, and when the film chuck device nips and holds the stripped protection film, the edges situated on both ends in the direction of width of the glass board may be simultaneously nipped and held, or one of them may be nipped and held. Also, the stripping processing unit may be installed as in the above embodiments or may be installed during the series of processes on the glass board. The apparatus may also be used for stripping a protection film on a board other than the glass board.

The adhering position to the protection film may be any position as long as it is at a corner of the board and near the edge of the protection film. It is more preferable that the stripping head and the adhesive tape are adhered and stripped in the state where they are slightly sticking out from the edge of the protection film.

Also, when nipping and holding the protection film and stripping the protection film from the adhesive tape, first, the adhesive tape may be stripped and then the protection film may be stripped off the glass board, instead of carrying out stripping of the adhesive tape and stripping from the glass board at a time. This operation is selectable at proper timing depending on the materials of the protection film and the adhesive tape.

Moreover, since it suffices that the adhesiveness of the adhesive tape is strong enough to adhere and strip the protection film, the feeding of the adhesive tape may be reduced and the adhesive surface may be repeatedly used. This reduces the consumption of the adhesive tape, and it is more efficient.

The invention claimed is:

1. A film stripping apparatus comprising:
adhesive tapes provided at both surfaces of a glass board that has protection films on both surfaces thereof, each of the adhesive tapes being situated near an edge of the glass board;
stripping heads provided at both surfaces of the glass board and corresponding respectively to the adhesive tapes, wherein each of the stripping heads is adapted to press an adhesive surface of a corresponding one of the adhesive tapes toward the glass board;
adhesive tape moving means for separating the adhesive tapes adhering to the protection films from the surfaces of the glass board and stripping parts of the protection films from the glass board;
film chuck devices that hold stripped edges of the protection films; and
stripping means for stripping the protection films held by the film chuck devices from both surfaces of the glass board;
wherein each of the stripping heads includes a pressing maintaining member that is provided to freely press and move the corresponding adhesive tape toward the glass board, wherein after the stripping head is abutted against the glass board via the corresponding adhesive tape, the pressing maintaining member temporarily holds the glass board when the stripping head retreats, so as to prevent the glass board from being lifted up together with the protection film.

2. The film stripping apparatus according to claim 1, wherein each of the stripping heads is positioned such that the corresponding adhesive tape can be pasted at a position sticking out from the protection film at one edge of a corner of the glass board.

3. The film stripping apparatus according to claim 2, further comprising air blowing means for blowing air at positions between the protection films and the glass board in a state in which the parts of the protection films are stripped by the adhesive tapes.

4. The film stripping apparatus according to claim 3, wherein the air blowing means is provided to be movable along one side of the glass board, and expands, over the one side of the board, the stripping of the protection films stripped at the corners of the glass board by the stripping heads.

5. The film stripping apparatus according to claim 1, wherein each of the stripping heads is provided in such a manner that it can sway where the corresponding adhesive tape is pressed to the glass board.

6. The film stripping apparatus according to claim 1, wherein the adhesive tapes are housed adhesive tape cassette units, respectively, and the adhesive tape cassette units are situated respectively at two ends of the glass board at both surfaces of the glass board.

7. The film stripping apparatus according to claim 6, wherein one of the film chuck devices is provided for each of the adhesive tape cassette units, and the film chuck devices are provided to be movable relative to the glass board.

8. The film stripping apparatus according to claim 6, wherein the stripping heads protrude from the adhesive tape cassette units, respectively, and the adhesive tape cassette units are provided to be attachable and removable integrally with the adhesive tape.

9. The film stripping apparatus according to claim 1, further comprising a plurality of tape tension adjusting mechanisms provided to respectively correspond to the adhesive tapes, wherein each of the tape tension adjusting mechanisms relaxes tension of the corresponding adhesive tape in an inward direction of the glass board in a state in which the stripping head corresponding to the adhesive tape is pressed to the protection film on the glass board.

10. A film stripping apparatus comprising:
adhesive tapes provided at both surfaces of a glass board that has protection films on both surfaces thereof, each of the adhesive tapes being situated near an edge of the glass board;
stripping heads provided at both surfaces of the glass board and corresponding respectively to the adhesive tapes, wherein each of the stripping heads is adapted to press an adhesive surface of a corresponding one of the adhesive tapes toward the glass board;
adhesive tape moving means for separating the adhesive tapes adhering to the protection films from the surfaces of the glass board and stripping parts of the protection films from the glass board;
film chuck devices that hold stripped edges of the protection films; and
stripping means for stripping the protection films held by the film chuck devices from both surfaces of the glass board;
wherein each of the stripping heads is positioned such that the corresponding adhesive tape can be pasted at a position sticking out from the protection film at one edge of a corner of the glass board;
wherein the apparatus further comprises air blowing means for blowing air at positions between the protection films and the glass board in a state in which the parts of the protection films are stripped by the adhesive tapes; and
wherein the air blowing means is provided to be movable along one side of the glass board, and expands, over the one side of the board, the stripping of the protection films stripped at the corners of the glass board by the stripping heads.

11. The film stripping apparatus according to claim 10, wherein each of the stripping heads includes a pressing maintaining member that is provided to freely press and move the corresponding adhesive tape toward the glass board, wherein after the stripping head is abutted against the glass board via the corresponding adhesive tape, the pressing maintaining member temporarily holds the glass board when the stripping head retreats, so as to prevent the glass board from being lifted up together with the protection film.

12. The film stripping apparatus according to claim 10, wherein each of the stripping heads is provided in such a manner that it can sway where the corresponding adhesive tape is pressed to the glass board.

13. The film stripping apparatus according to claim 10, wherein the adhesive tapes are housed adhesive tape cassette units, respectively, and the adhesive tape cassette units are situated respectively at two ends of the glass board at both surfaces of the glass board.

14. The film stripping apparatus according to claim 13, wherein one of the film chuck devices is provided for each of the adhesive tape cassette units, and the film chuck devices are provided to be movable relative to the glass board.

15. The film stripping apparatus according to claim 13, wherein the stripping heads protrude from the adhesive tape cassette units, respectively, and the adhesive tape cassette units are provided to be attachable and removable integrally with the adhesive tape.

16. The film stripping apparatus according to claim 10, further comprising a plurality of tape tension adjusting mechanisms provided to respectively correspond to the adhesive tapes, wherein each of the tape tension adjusting mechanisms relaxes tension of the corresponding adhesive tape in an inward direction of the glass board in a state in which the stripping head corresponding to the adhesive tape is pressed to the protection film on the glass board.

* * * * *